United States Patent [19]

Seitz

[11] 4,185,898

[45] Jan. 29, 1980

[54] DEVICE FOR PROJECTING A FILM PICTURE

[75] Inventor: Hermann H. Seitz, Niederwangen, Switzerland

[73] Assignee: Infra-Vision AG Zug, Switzerland

[21] Appl. No.: 846,992

[22] Filed: Oct. 31, 1977

[51] Int. Cl.² ............................................. G03B 37/00
[52] U.S. Cl. .................................... 352/69; 353/122; 354/94
[58] Field of Search ..................... 352/69, 79; 353/122; 355/104; 354/94

[56] References Cited

U.S. PATENT DOCUMENTS

| | | | |
|---|---|---|---|
| 2,438,137 | 3/1948 | Waller et al. | 352/69 |
| 3,051,041 | 8/1962 | Lehmann et al. | 353/122 |
| 3,166,973 | 1/1965 | Healey | 353/122 |
| 3,441,347 | 4/1969 | Lassig et al. | 355/104 |
| 3,850,516 | 11/1974 | Mallinson et al. | 353/122 |
| 4,078,860 | 3/1978 | Globus et al. | 352/69 |

FOREIGN PATENT DOCUMENTS 872866 7/1961 United Kingdom .................... 352/69

*Primary Examiner*—Monroe H. Hayes
*Attorney, Agent, or Firm*—McGlew and Tuttle

[57] ABSTRACT

A projector for projecting images of an image bearing film which has marginal edges and a central image bearing portion, comprises a film guide which includes vertically spaced, substantially cylindrical guide members. The image bearing film is guided radially to the periphery of said guide and is passed around the peripheries of the guides with the marginal edges engaged thereon and the image bearing portion disposed between the guides. A light source is arranged centrally of the guides and its rays pass through the image bearing film to a cylindrical interceptor surface which is arranged radially outwardly of the guide. The light source is advantageously arranged in connection with a rotary slotted housing in which the slots are spaced circumferentially around its periphery and project the light rays periodically to the image to give moving image effect. In another arrangement, the light source is disposed to project first to a mirror arranged radially outwardly of the guides and then back through the image and through a lens system disposed centrally of the guides and arranged to project to an interceptor surface arranged exteriorly of the guides and to one side thereof.

6 Claims, 4 Drawing Figures

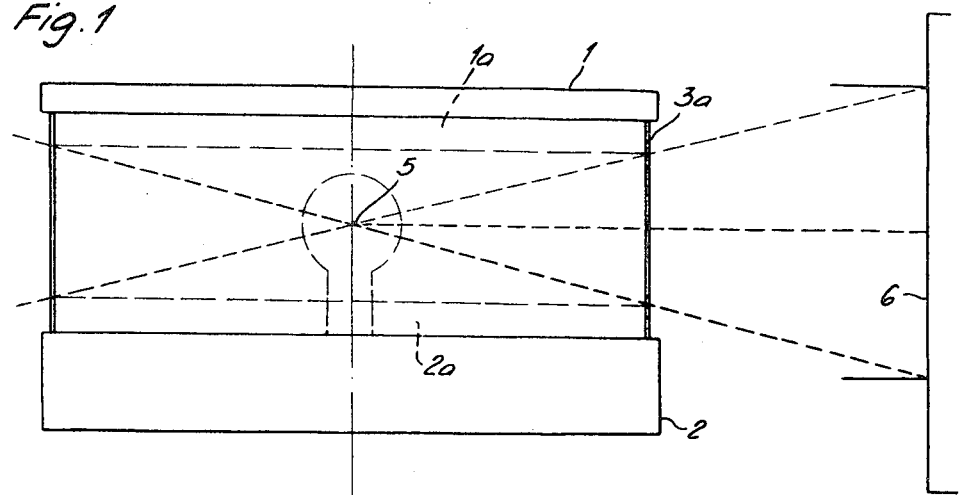
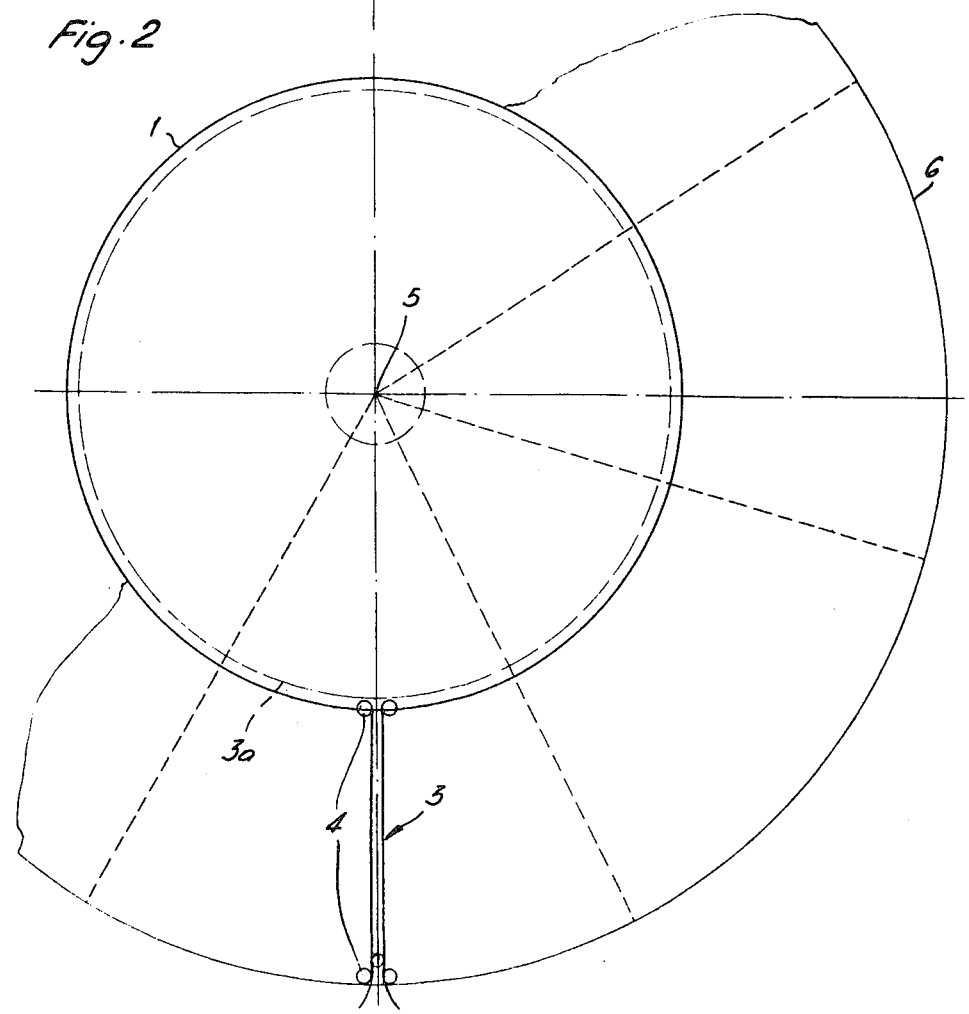

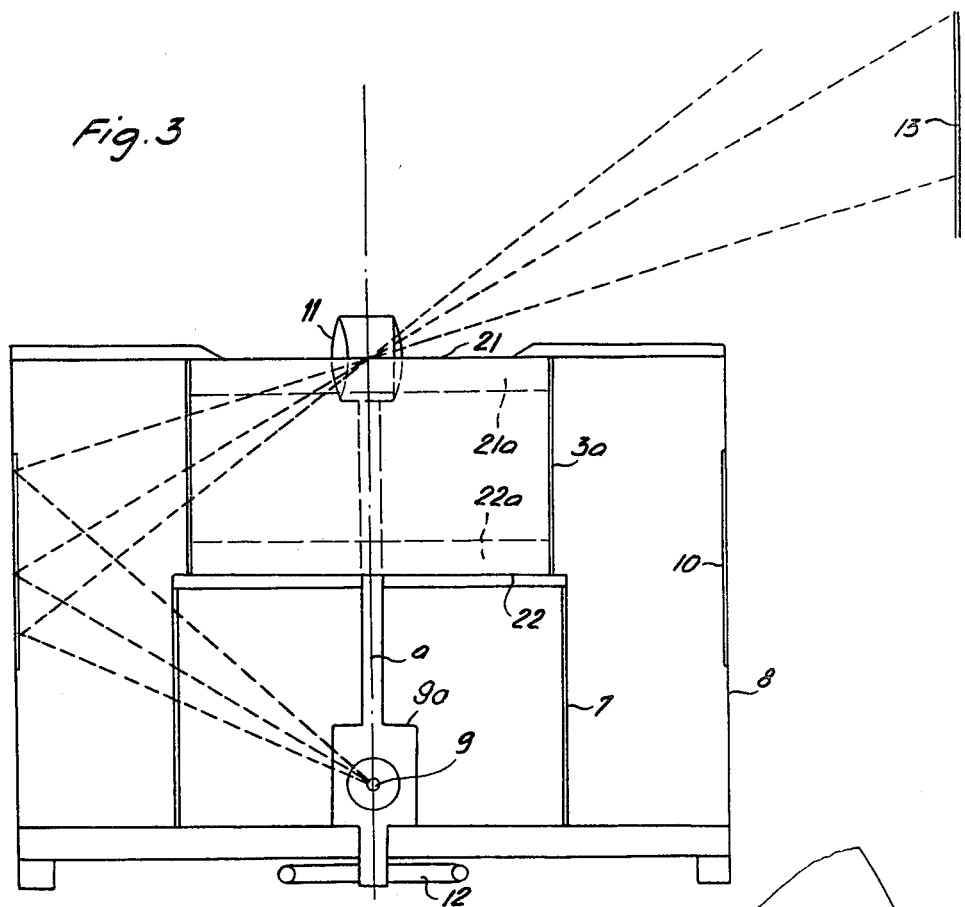
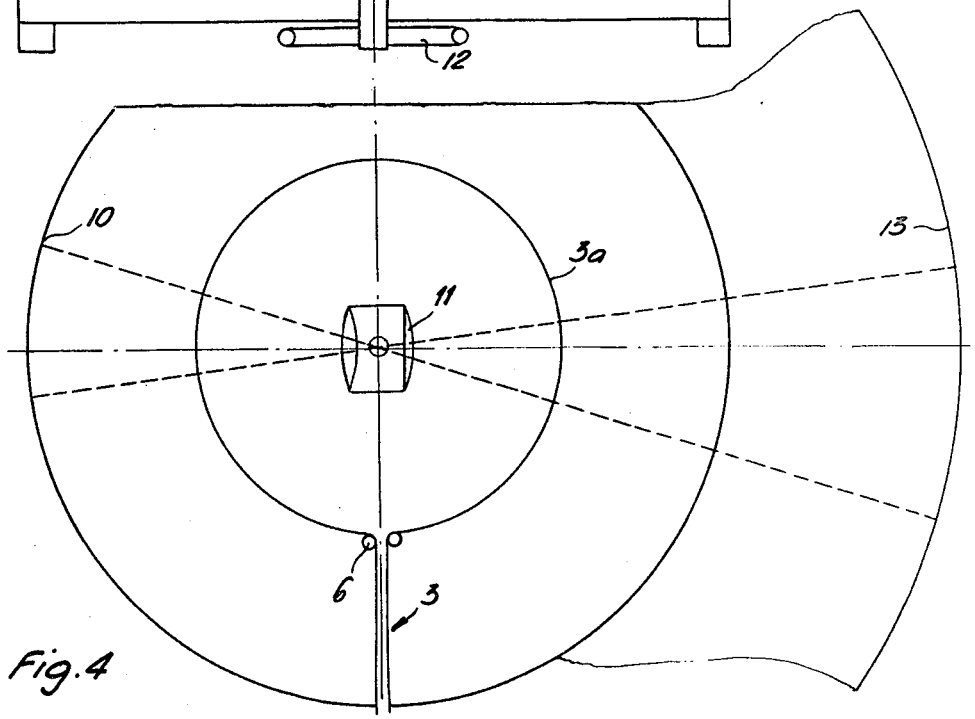

DEVICE FOR PROJECTING A FILM PICTURE

FIELD AND BACKGROUND OF THE INVENTION

This invention relates in general to projectors and, in particular, to a new and useful projector for projecting images of an image bearing film which has marginal edges and a central image bearing portion by directing it around spaced apart cylindrical guides with a light source disposed centrally of the guides passing its ray through the image bearing portion of the film to an annular intercepting surface so as to project substantially 360° of image.

DESCRIPTION OF THE PRIOR ART

Panoramic cameras are known with which, for example, high quality diapositives of 360° or more can be made. Up to the present time, however, no devices of equal quality have been available for projecting or enlarging such pictures. For this reason, the present invention is directed to a device of the above mentioned kind which makes it possible to reproduce the taken panoramic picture true to life, i.e., without the distortions which occurred in the usual projection of flat film strips known heretofore. This is not only desirable from the standpoint of the viewer of a projected image, but is even necessary for making enlarged pictures from projected images.

SUMMARY OF THE INVENTION

For this purpose, and in accordance with the invention, the projector comprises two coaxial rings which are firmly connected to each other in axially spaced relationship, having cylindrical circumferential surfaces, the diameters of which are equal to each other and which serve as supports for the film strip margins. A source of light is provided at a location such that the luminous rays of the light source, after having passed through the film strip, fall on an intercepting surface which is spaced from the axis of the rings by a distance corresponding to the desired size of projection.

Advantageously, the intercepting surface is closed upon itself and is cylindrical as well. However, it can also be a polygonal surface coaxial with the axis of the rings and may, for example, conform to the walls of a room. If the source of light is point-shaped and located in the axis of the rings, the light radiating to all sides, thus through 360°, produces a panoramic image on a coaxial intercepting surface closed upon itself, which image is enlarged in proportion to the radial spacing of the surface.

The intercepting surface may be formed by a projection screen or by a paper strip sensitive to light for making enlargements. In this case, however, it is advantageous to first direct the light, the source of which is disposed in the axis of the rings, radially to the outside of the rings, onto a coaxial mirror from where the luminous rays are reflected inwardly through the film strip and through a lens which is disposed in the axis of the rings and is rotatable about this axis. The image is passed through the lens to the intercepting surface.

In this design, a full revolution of the lens results in a complete projection of the picture strip on the intercepting surface. This is particularly suitable for making enlargements. However, the usual image projection may also be obtained with this design if the speed of rotation is appropriately chosen. The inventive device is suited not only for projecting individual pictures, but it is provided with an arrangement in which the individual pictures of a film band are continuously replaced on the rings by feeding the band at a required speed. The successive projection of the individual pictures may also advantageously produce a cinematic effect.

Accordingly, it is an object of the invention to provide a projector for projecting images of an image bearing film having marginal edges and a central image bearing portion, which comprises first and second spaced apart annular guides and feed means for feeding an image bearing film over substantially the whole periphery of said guides with the edges of the film engaged on the respective guides and the image bearing portion disposed therebetween and including an annular intercepting surface spaced radially outwardly from the guides and a light source located centrally of the guides so that the rays thereof pass through the image bearing portion of the film and project the image thereof onto the surface.

A further object of the invention is to provide a projector for projecting an image substantially 360°, which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the Drawings:

FIG. 1 is a side elevational view of a projector constructed in accordance with the invention;

FIG. 2 is a partial top plan view of the device shown in FIG. 1;

FIG. 3 is a view similar to FIG. 1 of another embodiment of the invention; and

FIG. 4 is a partial top plan view of the device shown in FIG. 3.

DESCRIPTION OF THE PREFERRED EMBODIMENTS

Referring to the drawings in particular, the device shown in FIGS. 1 and 2 comprises two coaxial rings 1 and 2 which are firmly connected to each other in axially spaced relationship and each has a respective cylindrical supporting surface 1a and 2a. These supporting surfaces 1a and 2a have diameters equal to each other and serve as areas of support against which the margins or edge zones of the positive or negative picture strip or image bearing film 3a to be projected are placed.

In the example shown, the picture strip 3a forms a portion of a film band 3 of substantially 360° panoramic pictures, which band may be fed to supporting rings 1 and 2 over rollers 4. A point light source 5 is provided in the axis a of rings 1 and 2 and halfway of the height of the image bearing portion of the picture strip 3a. The light radiated to all sides from the light source 5 penetrates the image of picture strip 3a and projects a correspondingly magnified panoramic image on a cylindrical intercepting surface 6 which is closed upon itself and provided at a suitable radial distance from the picture strip or axis a. By appropriately feeding the consecutive 360° picture strips of film band 3, a corresponding sequence of individual pictures can be projected.

Instead of a point light source 5, a light source comprising an enclosing tube 9a with a slot extending parallel to an axis a, as shown in the embodiment of FIGS. 3 and 4, might also be used and connected to drive means 12 for rotating the tube 9a. The light beam emerging from a point light source 9 passes through the rotating slot and penetrates successively one portion of the picture strip after the other and, with a suitable speed of rotation, continuously produces the enlarged individual image of the intercepting surface. A cinematic effect may be obtained by a suitable stepwise feed of the consecutive individual pictures of the film band by a drive in which the drive means comprises a pulley which is driven by a drive motor (not shown).

In the example of FIGS. 3 and 4, the rings 21 and 22, respectively provided with cylindrical supporting surfaces 21a and 22a, for picture strip 3a, are placed on supports 7 and are accommodated in a housing 8. The point-shaped light source 9 is provided within housing 8, again in axis a, but below rings 21 and 22, and a cylindrical mirror 10, coaxial with axis a and adjacent the inside wall surface of housing 8, is placed in the path of rays of the light source.

A lens 11, having its focal point in axis a, is placed in the path of rays reflected from mirror 10. Lens 11 is rotatable about axis a by drive means including a rotary drive connection 12. The diameter of supporting surfaces 21a and 22a for the picture strip corresponds to half the focal length of lens 11. The light of light source 9 reflected from mirror 10 passes through lens 11 and falls on a cylindrical intercepting surface 13 which is coaxial with axis a. With the lens in rotary motion, the whole panoramic picture of picture strip 3a is projected on intercepting surface 13 in the course of one revolution. Here again, the individual pictures of film strip 3 may be fed stepwise and by a suitable adjustment of the picture change to the rotational speed of the lens, a cinematic effect can be obtained.

If an enlarged copy of the picture is to be produced, instead of merely projecting the picture, a paper strip sensitive to light may be placed on intercepting surface 13. In this embodiment, instead of a light source radiating to all sides, a slotted source of light is advantageously provided which is rotatable in synchronism with the lens. For the first time, the invention makes it possible to reproduce panoramic pictures which are true to life.

While specific embodiments of the invention have been shown and described in detail to illustrate the application of the principles of the invention, it will be understood that the invention may be embodied otherwise without departing from such principles.

What is claimed is:

1. A device for projecting a film picture strip at an image angle including an angle of substantially 360°, comprising first and second spaced apart coaxial rings having cylindrical circumferential surfaces which have diameters equal to each other and serve as supports for the margins of the film picture strip, feed means including first means for guiding a film strip radially inwardly toward said rings with its margins guided over said circumferential surfaces and second means for guiding said strip radially outwardly from said rings, said first and second feed means being located closely adjacent each other so that the film is fed over substantially the whole of said circumferential surfaces, a point source of light disposed on the axis of said rings and spaced downwardly of said rings, a cylindrical mirror for reflecting the rays of said source of light coaxial with and disposed radially outwardly of said rings having at least a portion above said source of light to reflect the rays from the source of light upwardly and radially inwardly through the film strip guided over said circumferential surfaces, a cylindrical intercepting surface coaxial with said rings and disposed above said rings for receiving the rays reflected through the film strip, and a rotatable lens disposed along the axis of said rings in a position above said source of light and below said intercepting surface to receive the rays projected from said mirror through the film strip and to focus them on said intercepting surface.

2. A device according to claim 1, wherein said source of light includes a rotary light slot having an axis on the axis of said rings.

3. A device according to claim 1, wherein said intercepting surface comprises a polygonal surface coaxial with the axis of said rings.

4. A device according to claim 1, including means for feeding the picture strip in a stepwise manner to said rings.

5. A device according to claim 1, wherein said intercepting surface has means for exchangeably receiving photosensitive paper for producing copies of a magnified image.

6. A projector for projecting images of an image bearing film having marginal edges in a central image bearing portion, comprising first and second spaced apart annular film guides each having circular cylindrical peripheries, feed means for feeding an image bearing film over substantially the whole periphery of said guides with the edges of the film engaged on respective guides and the image bearing portion exposed between said guides, an annular intercepting surface spaced radially outwardly from said guides, a point source of light located on the axis of said annular film guides, said point source of light located outside of the axial interspace between said first and second spaced apart annular film guides, a cylindrical mirror located radially outside said first and second film guides and arranged so as to reflect the light rays from said source of light and inwardly through the central image bearing portion of the film, and a rotatable lens located along the axis of said first and second film guides and spaced from said source of light to receive the rays from the image bearing portion of the film and project them onto said intercepting surface.

* * * * *